Patented Oct. 28, 1941

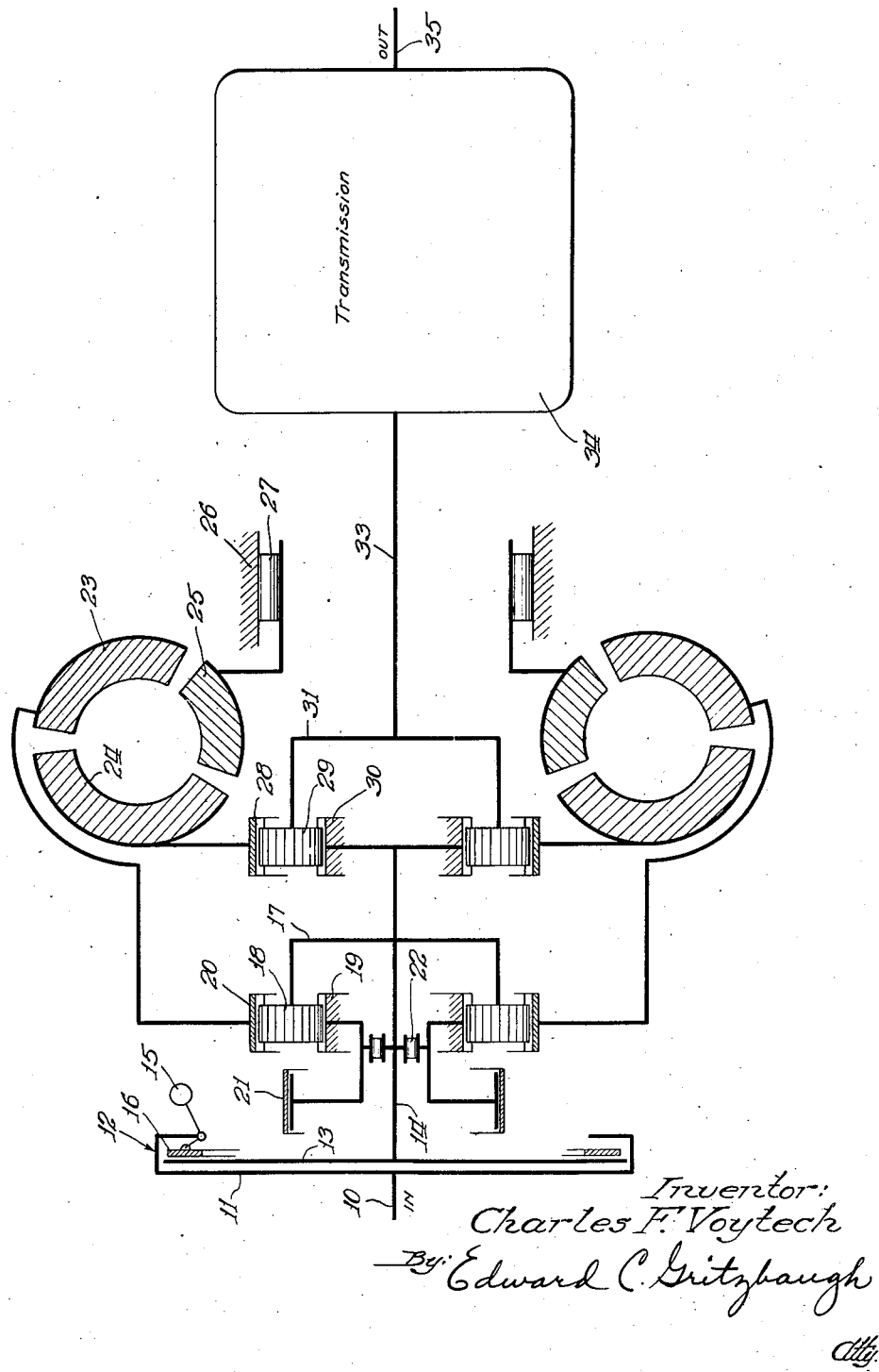

2,260,846

UNITED STATES PATENT OFFICE 2,260,846

TRANSMISSION

Charles F. Voytech, Chicago, Ill., assignor to Borg-Warner Corporation, Chicago, Ill., a corporation of Illinois Application May 11, 1940, Serial No. 334,497

7 Claims. (Cl. 74—189.5)

This invention relates to transmissions of the hydrodynamic type which are to be used for automotive equipment, and particularly to hydrodynamic transmissions combined with gearing.

Hydrodynamic torque converters are provided with one or more stationary vaned elements or stators the function of which is to provide a fulcrum for torque multiplication. If the converter is to transmit torque at high speeds, the stator becomes useless and in fact impedes the orderly flow of fluid through the converter thus adversely affecting the efficiency of the converter. To improve the efficiency at high speeds it has been customary to release the stator and permit it to rotate at will under the influence of the fluid, in this manner changing the torque converter into a simple hydrodynamic coupling. Even with this arrangement, however, it has been difficult to obtain efficiencies greater than 85% at high speeds. Designers have therefore resorted to the use of auxiliary devices which, when used with hydrodynamic torque converters, provide a transmission having higher overall efficiency.

One of the devices proposed for the improvement in the efficiency of a hydrodynamic torque converter is differential gearing used in a manner which will split the power into two paths, one of which paths is a purely mechanical path and therefore theoretically 100% efficient, and the other of which is a hydrodynamic path. Since the latter transmits only a fraction of the total power, the overall efficiency may be as high as 92% or greater, depending upon the maximum efficiency of the converter.

Even with this so-called two-path power flow arrangement, a great deal depends upon the type of two-path arrangement used. In some forms the increased efficiency is obtained at a sacrifice in torque multiplication, which means that when used in an automobile the acceleration is poor.

The principal object of this invention is to provide an improved transmission of the hydrodynamic type wherein the two-path power flow principle is used and which possesses better acceleration characteristics than hydrodynamic transmissions heretofore known.

This invention can best be explained with reference to the accompanying drawing which forms a part of this specification, the single figure of which is a schematic representation of a transmission of the two-path type modified in accordance with this invention to provide improved acceleration. In the interest of simplicity and clarity, all bearings, casings, fastenings, etc., have been omitted, it being understood that any one skilled in the art could supply these wherever necessary.

Referring now to the drawing, the drive shaft 10 of a prime mover having low starting torque characteristics such as an internal combustion engine (not shown) is connected to the driving element 11 of a speed controlled clutch 12, the driven element 13 of which is connected to an intermediate drive shaft 14. The control for clutch 12 may comprise weighted levers 15 which are adapted to compress driven element 13 between driving element 11 and a pressure plate 16 above a predetermined speed of rotation of shaft 10.

Intermediate shaft 14 is connected in driving relation to a carrier 17 on which are mounted planet pinions 18. Said pinions 18 mesh with a sun gear 19 and a ring gear 20 which are mounted concentrically with respect to intermediate drive shaft 14. Sun gear 19 is provided with a brake 21 by means of which the gear may be held against rotation in either direction. An overrunning clutch 22 is mounted between sun gear 19 and intermediate drive shaft 14 and is so constructed as to prevent sun gear 19 from rotating ahead of drive shaft 14. Thus when brake 21 is released and a load is applied to ring gear 20 the reaction of the ring gear tends to cause sun gear 19 to rotate ahead of intermediate shaft 14, but since overrunning clutch 22 prevents such increased rotation, the net result is to lock the entire planetary gear set 18, 19 and 20 for rotation as a unit.

To ring gear 20 is connected a pump element 23 of a hydraulic torque converter having a turbine element 24 and a stator element 25, arranged to provide a toroidal path for the flow of driving fluid therebetween. Stator 25 is connected to a stationary portion of the transmission 26 though a one-way brake 27 preferably of the roller type, the brakes being so arranged as to prevent backward rotation of the stator but to permit forward rotation thereof when the direction of flow of the fluid in the converter is such as to require this forward movement.

Turbine element 24 is connected to a ring gear 28 of a second planetary gear set having planet pinions 29 meshing with ring gear 28 and a sun gear 30 meshing with planet pinions 29. The sun gear 30 is directly connected to intermediate drive shaft 14 so that sun gear 30 and planet carrier 17 of the first gear set rotate together. Planet pinions 29 of the second gear set are connected to a carrier 31 which in turn is connected to an output shaft 33. A suitable reversing mechanism 34 may be connected to output shaft 33 to provide a means for driving tail shaft 35 in a reverse direction when and if desired. The operation of the transmission device is as follows:

Assuming that drive shaft 10 is rotated above the idling speed of the engine and, furthermore, above the speed at which clutch 12 is operative, power is then applied to intermediate drive shaft 14 to rotate carrier 17 and its associated pinions 18, and sun gear 30 of the second planetary gear set. With brake 21 applied, sun gear 19 will be held stationary and ring gear 20 will therefore be driven at an overspeed with respect to drive shaft 10. This causes pump element 23 of the hydrodynamic torque converter to be driven at an overspeed with respect to drive shaft 10 causing a more rapid circulation of the fluid between elements 23, 24 and 25 than would ordinarily be the case. This in turn causes a greater turning moment or torque to be impressed upon turbine element 24 and its associated ring gear 28. Since sun gear 30 is driven at engine speed and the torque on ring gear 28 is greater than would normally be the case the resistance of the load in shaft 33 and pinion carrier 31 is more readily overcome, resulting in greater acceleration.

It will be noted that the power from drive shaft 10 is split into two paths, one of which is a mechanical path containing intermediate drive shaft 14, sun gear 30, and pinions 29, and the other path containing intermediate drive shaft 14, first planetary carrier 17, planet pinions 18, ring gear 20, pump element 23, turbine element 24, second ring gear 28, and pinions 29.

It will also be noted that as the speed of pump element 24 increases, if brake 21 remains applied, the turbine element 24 would eventually be driven at an overspeed with respect to drive shaft 10, which will result in an overspeed in driven shaft 33 with respect to the engine. The transmission therefore is capable of providing an infinite number of speed ratios between the driving and driven shafts ranging from an underdrive ratio to an overdrive ratio.

If greater acceleration should be desired at higher speeds, brake 21 may be released to permit pump element 23 to be driven at engine speed, thereby relieving the engine of a portion of its load and permitting it to speed up to provide greater acceleration.

It is understood that the arrangement of parts shown in the drawings is purely illustrative and that the parts may be arranged in other ways to meet special conditions.

I claim:

1. A transmission comprising a drive shaft, a driven shaft, an infinitely variable speed ratio changing device, overspeed gearing connected to the drive shaft and to the input to the infinitely variable speed ratio changing device, differential gearing, and means connecting the differential gearing to the driving and driven shafts, said differential gearing having at least three elements, the output of the speed ratio changing device being connected to one of said elements.

2. A transmission comprising a driving shaft, a driven shaft, an infinitely variable torque multiplying device, overspeed gearing connected to the driving shaft and to the input to the infinitely variable torque multiplying device, differential gearing, and means connecting the differential gearing to the driving and driven shafts, said differential gearing having at least three elements, the output of the torque converter being connected to one of said elements.

3. A transmission comprising a driving shaft, a driven shaft, an infinitely variable torque multiplying device concentrically arranged with respect to the driving and driven shafts, overspeed gearing connected to the driving shaft and to the input to the infinitely variable torque multiplying device, differential gearing, and means connecting the differential gearing to the driving and driven shafts, said differential gearing having at least three elements, one of which elements is connected to the output of the torque multiplying device.

4. A transmission comprising a driving shaft, a driven shaft, a hydraulic torque converter concentrically arranged with respect to the driving and driven shafts, overspeed gearing connected to the driving shaft and to the input to the converter, differential gearing having at least three elements, one of said elements being connected to the output of the converter, and means connecting another to the drive shaft, the third being connected to the driven shaft.

5. A transmission comprising a driving shaft, a driven shaft, a hydraulic torque converter concentrically arranged with respect to the driving and driven shafts, overspeed gearing connected to the driving shaft and to the input to the converter, and a planetary gear set comprising a ring gear connected to the output of the converter, a sun gear directly connected to the driving shaft, planet pinions meshing with the sun and ring gears, and a carrier for the planet gears, said carrier being connected to the driven shaft.

6. A transmission comprising a driving shaft, a driven shaft, differential gearing comprising a plurality of elements one of which is directly connected to the driving shaft, and another of which is connected to the driven shaft, an infinitely variable torque multiplying device the output of which is connected to a third element of the differential, and means for driving the said torque multiplying device from the drive shaft selectively either at the same speed as the drive shaft or at a speed greater than the speed of the drive shaft.

7. A transmission comprising a drive shaft, a driven shaft, means connecting the driving and driven shafts and adapted to divide the power into two paths, said means comprising a planetary gear set having a ring gear, a sun gear, planet pinions meshing with the sun and ring gears, and a carrier, said sun gear being driven by the drive shaft, and said carrier driving the driven shaft, a second carrier driven by the drive shaft, planet pinions on said carrier, a sun gear meshing with the pinions, means for braking the last mentioned sun gear, means for causing the last mentioned sun gear to rotate with the drive shaft, a hydraulic torque converter having a pump element and a turbine element, and a ring gear meshing with the planets on the second carrier, said ring gear driving the pump element of the converter.

CHARLES F. VOYTECH.